(12) United States Patent
Raghunandan (10) Patent No.: US 7,720,854 B2
(45) Date of Patent: May 18, 2010

(54) TECHNIQUES FOR ACCESSING A TABLE (75) Inventor: Makaram Raghunandan, Northboro, MA (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 11/467,293

(22) Filed: Aug. 25, 2006

(65) Prior Publication Data

US 2008/0052304 A1    Feb. 28, 2008

(51) Int. Cl.
G06F 7/00 (2006.01)
G06F 17/30 (2006.01)

(52) U.S. Cl. .................. 707/755; 707/736; 707/756; 707/802; 707/999.002; 707/999.101

(58) Field of Classification Search .................. 707/101, 707/1–3, 6, 100–103 R
See application file for complete search history.

(56) References Cited

U.S. PATENT DOCUMENTS

| 6,388,586 | B1 * | 5/2002 | Fischer et al. | 341/51 |
| 7,430,560 | B1 * | 9/2008 | Mittal | 707/101 |
| 2004/0105442 | A1 * | 6/2004 | Ko et al. | 370/392 |
| 2004/0165588 | A1 * | 8/2004 | Pandya | 370/389 |
| 2004/0264479 | A1 | 12/2004 | Raghunandan | |
| 2005/0018601 | A1 * | 1/2005 | Kalkunte et al. | 370/229 |
| 2005/0063370 | A1 * | 3/2005 | Beshai et al. | 370/360 |

FOREIGN PATENT DOCUMENTS

EP    1 265 161 A2    12/2002
GB    2 350 534 A1    11/2000

OTHER PUBLICATIONS

William N. Eatherton, "Hardware-Based Internet Protocol Prefix Lookups", Washington University Server Institute of Technology Department of Electrical Engineering, May 1999, Saint Louis, Missouri, XP-002298996, 108 pages.
Huan Liu, "Routing Table Compaction in Ternary CAM", IEEE Micro, Jan.-Feb. 2002, pp. 58-64.
Ravikumar V.C. Rabi Mahapatra et al., "Modified LC-Trie Based Efficient Routing Lookup", The Computer Society, Proceedings of the 10th IEEE Int'l Symp. on Modeling, Analysis, & Simulation of Computer I Telecommunications Systems (MASCOTS'02), IEEE 2002, 6 pages.
Miguel A. Ruiz-Sanches et al., "Survey and Taxonomy of IP Address Lookup Algorithms", IEEE Network, Mar./Apr. 2001, 2001 IEEE, pp. 8-23.

* cited by examiner

Primary Examiner—John Breene
Assistant Examiner—Hares Jami
(74) Attorney, Agent, or Firm—Glen B Choi

(57) ABSTRACT

Techniques are described herein that can be used to access entries in a packed table. An unpacked table includes empty and filled elements. Filled elements can be accumulated and included in a packed table. An element in the packed table can be accessed by considering the location the element would have been located in the unpacked table. The location can be used to determine the location of the element in the packed table.

9 Claims, 9 Drawing Sheets

| Match Pointer | Next Trie Pointer |
|---|---|

31　　　　　　　　15　　　　　　　　0

16 bit trie block

31　　　　　　　　　　　　　　0
- Trie Entry 0000
- Trie Entry 0001
- Trie Entry 0002
- Trie Entry 0003
- Trie Entry 0004
- ⋮
- Trie Entry FFFB
- Trie Entry FFFC
- Trie Entry FFFD
- Trie Entry FFFE
- Trie Entry FFFF

8 bit trie block

31　　　　　　　　　　　　　　0
- Trie Entry 00
- Trie Entry 01
- Trie Entry 02
- ⋮
- Trie Entry FD
- Trie Entry FE
- Trie Entry FF

TECHNIQUES FOR ACCESSING A TABLE

FIELD

The subject matter disclosed herein relates to accessing a table.

RELATED ART

Figure 1:
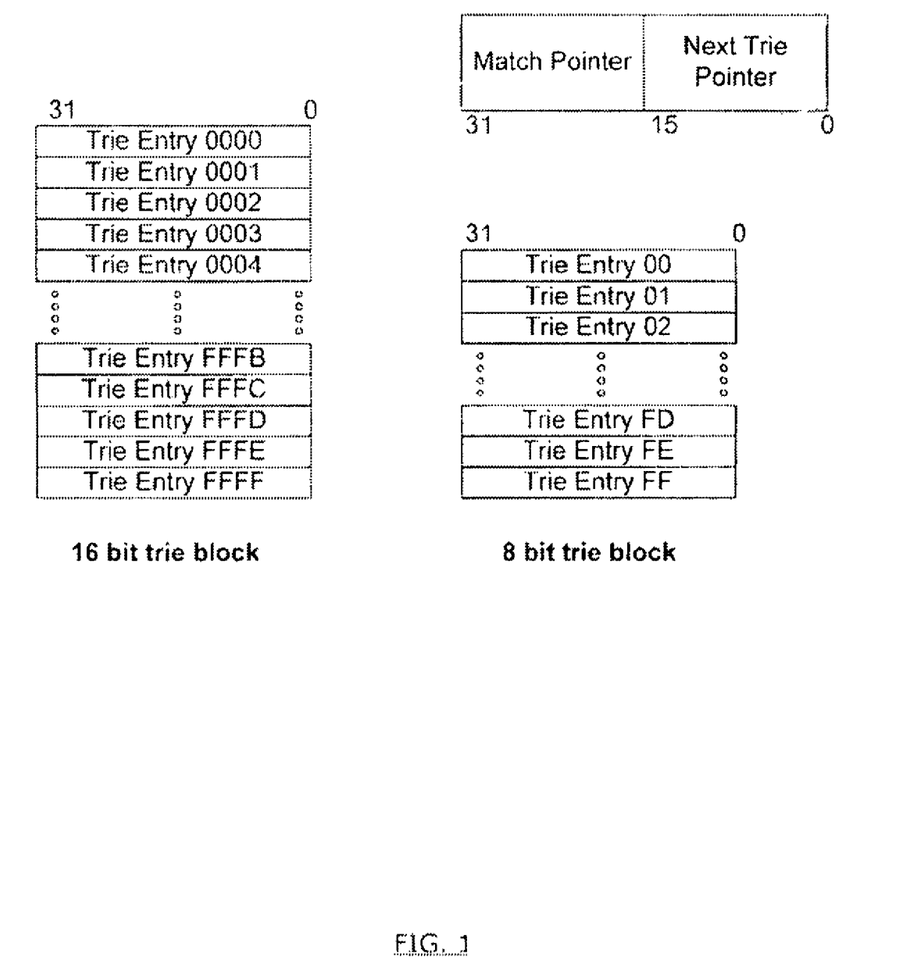
FIG. 1 shows an example of trie block data structures used for longest prefix matching route lookups.

Trie data structures are used in many applications. For example, Trie data structures are used at least for IPv4 and IPV6 longest prefix matching (LPM) route lookup and anti-virus or spam detection in unified threat management systems which use pattern matching techniques such as but not limited to Aho-Corasick. FIG. 1 shows an example of trie block data structures used for longest prefix matching route lookups. The Trie based lookup scheme uses a set of trie blocks that are linked together to create a multi-way tree structure. This tree is traversed during the lookup to find a matching entry. A lookup key is divided into portions, and each portion is represented by a trie-block. A trie-block is an array of trie-entries. When the trie-entry is valid, it contains a pointer to matching entry, a pointer to another trie-block, or both. If no data maps to a given trie-entry, then the trie-entry is marked empty.

Trie blocks tend to have large memory footprints. For example, IPv6 implementations typically use a 16-bit trie-block (which stores 65,536 entries) for the root node of the tree and 8-bit trie-blocks (which store 256 entries) for nodes in the next levels of the tree. This is represented as a 16-8-8-8-8-8-8 trie structure. By contrast, IPv4 implementations typically use a 16-bit trie-block (65,536 entries) for the root node of the tree and 4-bit trie-blocks (16 entries) for nodes in the next levels of the tree, which can be represented as 16-4-4-4-4 . The size of the trie blocks is called the "stride" and it is the number of bits of the prefix mask that is matched at iteration of a trie-walk. The size of the "stride" impacts the number of memory accesses needed. The IPV6 trie structure of 16-8-8-8-8-8-8 typically has a maximum of 7 memory accesses, whereas for a IPv4 16-4-4-4-4 trie structure, typically a maximum of 5 accesses.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Some embodiments of the present invention may provide for storing populated entries in a table while not storing unused entries from the table thereby to provide a packed table. However, some embodiments may include storing populated entries in a packed table while not storing one or more unused entries from the packed table. Some embodiments of the present invention may provide at least for an indication of "valid" or "empty" elements in the packed table and techniques for lookup of entries potentially stored in a packed table. A "valid" entry may be one that is present in the packed table whereas an "empty" element may be an entry that is absent from the packed table or is defective or non-compliant. The techniques can be adopted at least in any applications which use trie data structure. Trie data structures may be used in environments such as but not limited to n-tuple lookup, pattern matching, intrusion detection, virus scanning, spam scanning, and computational biology. For example in pattern matching, a technique called Aho-Corasick may be used. Aho-Corasick uses each byte of the input stream as a lookup into an 8 bit (256 entry) trie table.

Although not a necessary feature of any embodiment, some embodiments may at least (1) reduce the size of memory needed for storing a trie structure; (2) better utilize cache for improved performance; and (3) reduce memory bandwidth utilization on a table miss.

Figure 2:
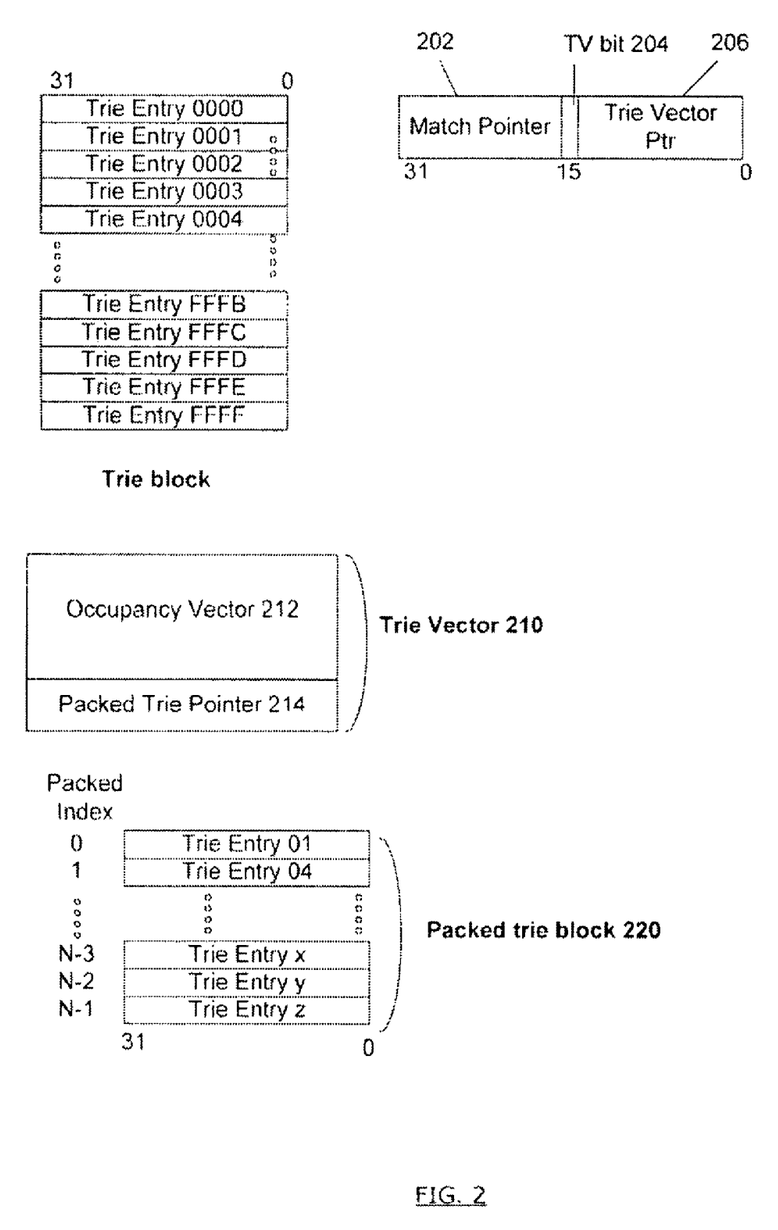
FIG. 2 shows an example of structures that can be used for packed table access, in accordance with some embodiments of the present invention.

Some embodiments of the present invention may use elements shown in FIG. 2. In some embodiments, one or more entry in a trie block may include at least a match pointer 202, a trie vector valid indicator (TV bit) 204, and a trie vector pointer 206. A trie block may be any size and may be addressable at least by 16 bit or 8 bit size inputs.

Match pointer 202 may be similar to match pointer in the trie entry of FIG. 1. Match pointer 202 may be used to find an entry in the table. For example, match pointer 202 may be 16 bits and occupy bits 16 to 31 of the entry. TV bit 204 may be one bit and located at bit position 15. Trie vector pointer 206 may be a 15 bit sized pointer and occupy bits 0 to 14. TV bit 204 may be a one-bit flag that indicates whether trie vector pointer 206 is a pointer to the next trie block (similar to next trie pointer of FIG. 1) or a pointer to trie vector 210. Other sizes of fields in an entry may be used. In some embodiments, TV bit 204 may be cleared to indicated that the entry does not include a pointer to trie vector 210 when the unpacked trie block is substantially full.

Trie vector 210 may include at least: occupancy vector 212 and packed trie pointer 214. Trie vector 210 may be 15 bits in length although other sizes may be used. In some embodiments, occupancy vector 212 may be a size such that it contains one bit for each potential entry in an unpacked trie block. For example, for a 8 bit trie block with 256 potential entries, occupancy vector 212 may be 256 bits (32 bytes). For each "present" or "valid" trie entry in an unpacked version of packed trie block 220, the corresponding bit may be set to '1' in occupancy vector 212. For example, if entries, 1, 4, 7, and 15 are valid then occupancy vector [31:0] would be 0x8092.

Packed trie pointer 214 may point to packed trie block 220. If the occupancy vector indicates a valid entry is stored for the current index, then packed trie pointer 214 may be used to access packed trie block 220 to retrieve the valid entry.

Packed trie block 220 may be sized to match the number of valid entries. For example, if a trie block could include 256 entries but only 10 entries are valid, then packed trie block 220 may include 10 entries. In some embodiments, packed trie block 220 may store more than a number of valid entries at least to allow for table growth. In some embodiments, packed trie block 220 may store more than a number of valid entries to allow for table growth and have a number of entries having a power of 2. Accordingly, an index associated with one of the ten packed entries may be different than that used to retrieve an entry from a table with 256 entries. Contents of occupancy vector 212 may be inspected to determine if there is a valid entry for a lookup key based index. When a valid entry is present, then occupancy vector 212 may be used to convert the lookup key based index into a packed index value which is used to retrieve the entry from packed trie block 220.

In some embodiments, occupancy vector 212 may be combined with packed trie block 220, thereby eliminating a separate packed trie pointer 214. This may reduce the memory footprint used to store trie vector 210 and packed trie block 220. Additionally, occupancy vector 212 and first several entries of packed trie block 220 (unto for example cache line size) can be read in a single burst. Given the packing of data structure, it is likely that the read of the packed trie block will be in the pre-fetched data, thereby greatly reducing latency involved in reading the proper entry in packed trie block 220.

When packing larger the blocks (for example 16 bit trie block) the cost of determining the packed index can be substantial, For example, in the 16 bit trie case, occupancy vector 212 is 2000 words (8000 bytes) in size. The compute burden for a 32 bit processor can be reduced considerably by treating several words as a line of occupancy vector and maintaining a pre-determined valid entry bit count on a per line basis. By appropriately packing the cumulative total with occupancy vector 212, additional memory accesses can be eliminated. For example for the 16 bit trie case, there could be 256 eight-word lines.

In some embodiments, contents of an entry in a trie block may be inspected after retrieval. If the entry is from a non-packed table such as one similar to that described with regard to FIG. 1, an entry from a non-packed table may be used to determine a next trie pointer for a next table. If the entry includes a TV bit and the TV bit indicates the entry references a packed table, then the occupancy vector may be inspected to determine whether a valid entry is stored for the current index. If the occupancy vector indicates a valid entry is stored for the current index, then each valid entry in the occupancy vector up to and including the entry of interest may be counted to determine the packed index number. The packed trie pointer and packed index number can be used to retrieve the entry for the current index from a packed table. If the entry includes a TV bit and the TV bit indicates the entry does not reference a packed table, then trie vector pointer from the entry may be used as a next trie pointer to access a non-packed table.

In some embodiments, pattern matching (e.g., Aho-Corasick) can be implemented using hardware (e.g., firmware, an application specific integrated circuit (ASIC), and/or a field programmable gate array (FPGA) and use embodiments of the present invention to access packed and unpacked tables.

Figure 3A:
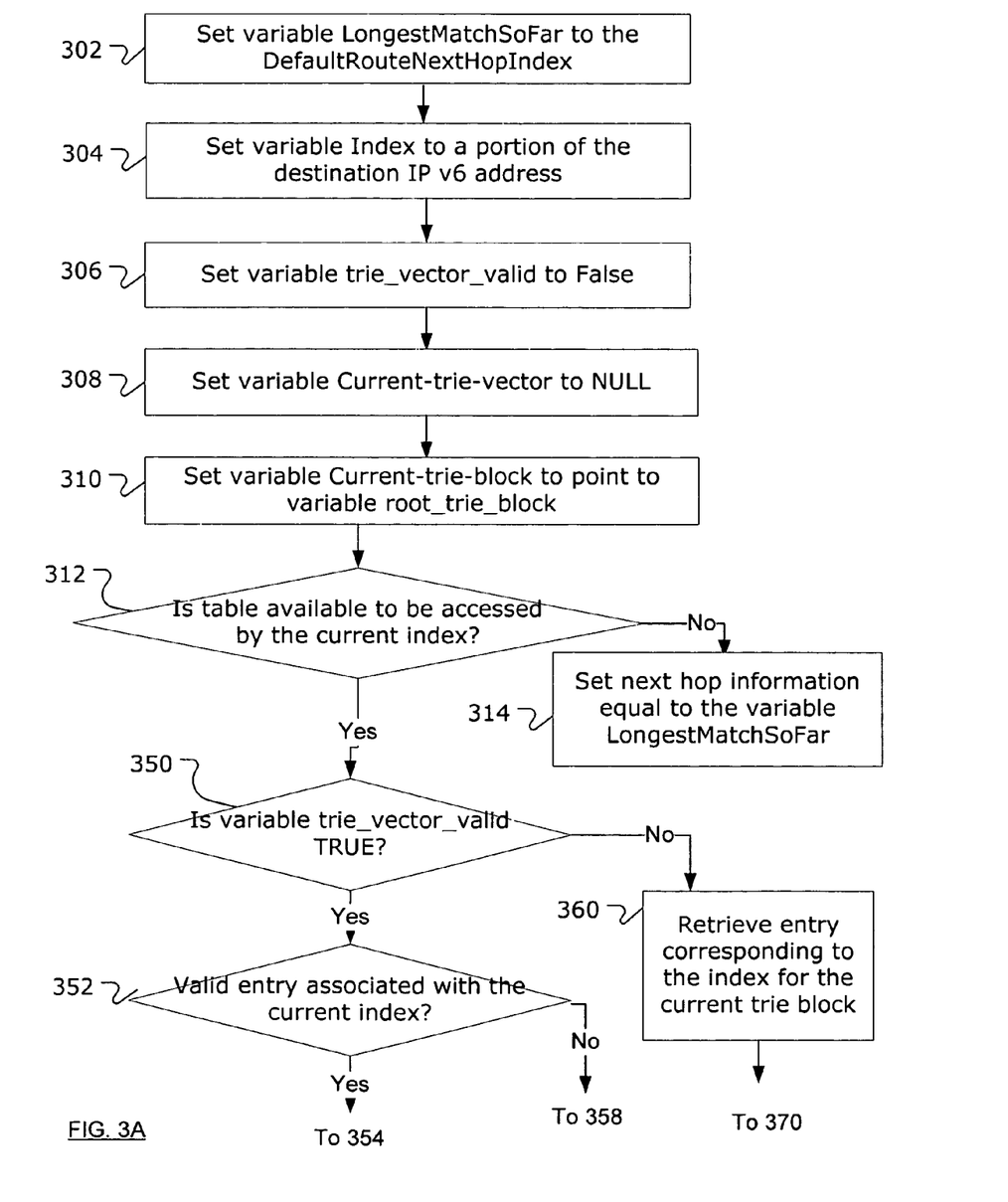
FIGS. 3A to 3C depict flow diagrams for a process that can be used for trie entry lookups, in accordance with some embodiments of the present invention.
Figure 3B:
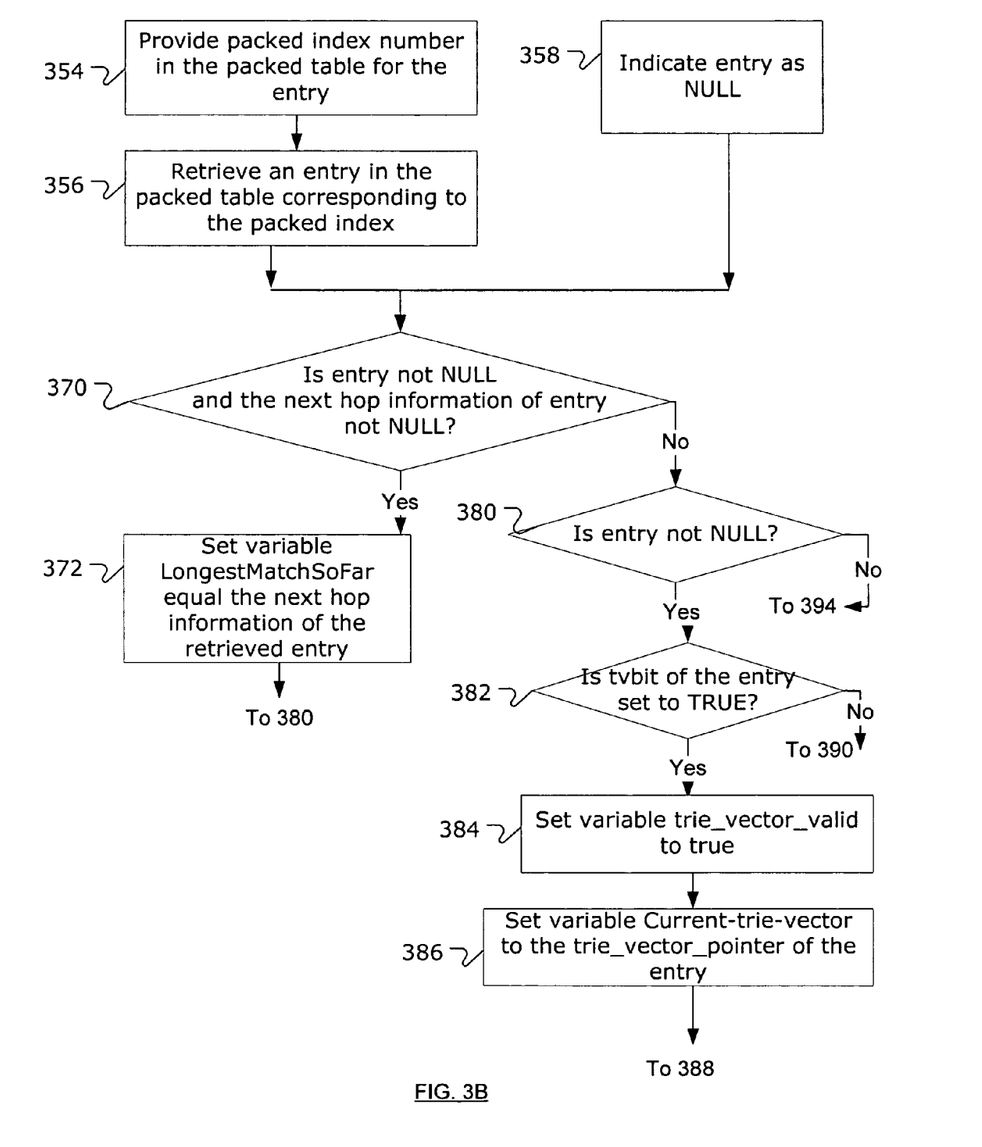
Figure 3C:
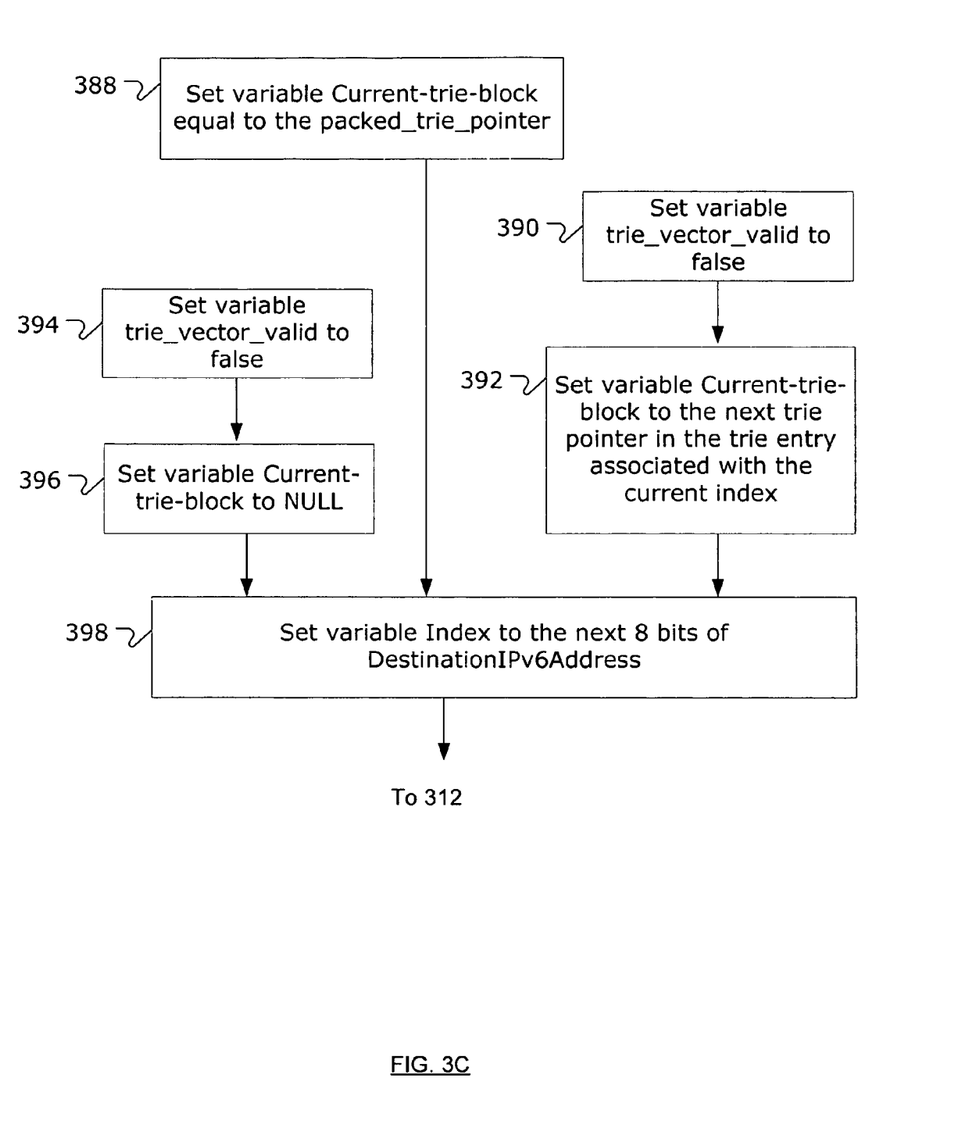

FIGS. 3A to 3C depict flow diagrams for a process that can be used for trie entry lookups, in accordance with some embodiments of the present invention. The process can be used in a router to provide next hop information for a destination IP v6 address. However, the process can be used in other environments and/or provide other information based on any other input. For example, this process can be used in any environment where a trie entry lookup takes place.

In block 302, a variable LongestMatchSoFar may be set to the DefaultRouteNextHopindex. Variable LongestMatchSoFar may be used to store next hop information from an entry located during a trie entry lookup. Variable DefaultRouteNextHopIndex may be set to be a default next hop value and may be used in cases where no entry match occurs in a table for the first 16 bits of the destination IP v6 address. Variable LongestMatchSoFar may be updated by traversing one or more trie blocks.

In block 304, variable Index may be set to a portion of the destination IP v6 address. For example, variable Index may be set to the first 16 bits of the destination IP v6 address. Other portions of the destination IP v6 address or other addresses and information may be used.

In block 306, variable trie_vector_valid may be set to False to indicate an assumption that no packing is used for the table accessible by the first 16 bits of the destination IP v6 address. Variable trie_vector_valid may be used to indicate whether a packed table is to be accessed by the current index. Variable trie_vector_valid may include similar information as TV bit 204 described earlier. In other embodiments, packing may be used for the table accessible by the first 16 bits of the destination IP v6 address and variable trie_vector_valid is set to True.

In block 308, variable Current-trie-vector may be set to NULL. The assumption is that no packing is used for the table accessible by the first 16 bits of the destination IPV6 address and accordingly no trie vector is available for such table. The trie vector may include similar information as trie vector pointer 206 of FIG. 2. In other embodiments, packing may be used and accordingly a trie vector pointer may point to a trie vector that includes similar information as in trie vector 210.

In block 310, variable Current-trie-block may be set to point to variable root_trie_block. Variable Current-trie-block may track the table that is to be accessed by the current index whereas variable root_trie_block may point to a first table to be accessed by the first 16 bits of the destination IP v6 address or other portion of other information.

In block 312, a determination may be made whether a table is available to be accessed by the current index. If a table is available to be accessed by the current index, then block 350 may follow. If a table is not available to be accessed by the current index, then block 314 may follow.

In block 314, the next hop information may be set equal to the variable LongestMatchSoFar.

In block 350, a determination may be made whether the variable trie_vector_valid is TRUE. If variable trie_vector_valid is TRUE, then a packed trie block is accessed by the current index. For example, trie_vector_valid may include similar information as the TV bit. If the trie_vector_valid is TRUE, block 352 may follow. If the trie_vector_valid is FALSE, block 360 may follow.

In block 352, a determination may be made whether a valid entry is associated with the current index. An occupancy vector is inspected to determine whether a valid entry is associated with the current index. The occupancy vector may include similar information as occupancy vector 212. The occupancy vector may be referenced by the trie vector pointer. If the entry is valid then block 354 follows. If the entry is not valid then block 358 follows. Any techniques may be used to inspect the occupancy vector to determine whether a valid entry is stored in a packed table for the current index. For example, for a 8 bit trie block with 256 potential entries, occupancy vector would be 256 bits (32 bytes). For each "present" or "valid" trie entry in an unpacked version of the packed trie block, the corresponding bit is set to '1' in the occupancy vector. For example, where 32 bit arithmetic is used, techniques described with respect to FIG. 4 may be used to determine whether valid entry corresponds to the current index based on the occupancy vector.

In block 354, a packed index number in the packed table for the entry identified by the current index may be provided. If the occupancy vector indicates a valid entry is stored for the current index, then each valid entry in the occupancy vector up to and including the entry of interest may be counted to determine the packed index number. The packed index number can be used to retrieve the entry for the current index from a packed table. For example, for 32 bit arithmetic, techniques described with respect to FIG. 5 may be used to determine a packed index number.

In block 356, the process may retrieve an entry in the packed table corresponding to the packed index. Block 370 may follow block 356.

In block 358, the entry may be indicated as NULL to indicate that no entry or an invalid entry is present for the current index. Block 370 may follow block 358.

In block 360, the entry corresponding to the index for the current trie block may be retrieved. Block 360 is used at least when a table accessed by the current index is not packed. For example, an unpacked table and its entries may have a format similar to that described with regard to FIG. 1. Block 370 may follow block 360.

In block 370, a determination may be made whether both the entry is not NULL and the next hop information of the entry is not NULL. If both the entry is not NULL and the next hop information of the entry is not NULL, then block 372 may follow. If any of the entry or the next hop information of the entry is NULL, then block 380 may follow.

In block 372, variable LongestMatchSoFar may be set to equal the next hop information of the retrieved entry. The next hop information of the retrieved entry may be from an entry from a packed or unpacked table (i.e., match pointer). Block 380 may follow block 372.

In block 380, a determination may be made whether the retrieved entry is not NULL. If the retrieved entry is not NULL, then block 382 may follow. If the retrieved entry is NULL, then block 394 may follow.

In block 382, a determination may be made whether the tvbit of the entry is set to TRUE. The tvbit indicates whether the next table associated with the entry is packed or unpacked. If the tvbit of the entry is set to TRUE, then block 384 may follow. If the tvbit of the entry is not set to TRUE, then block 390 may follow.

In block 384, variable trie_vector_valid may be set to true to indicate that the entry references a packed table so that the next index will be used to access an entry from a packed table.

In block 386, variable Current-tree-vector may be set to the trie_vector_pointer of the entry associated with the current index. Block 386 sets the trie vector for the next index.

In block 388, variable Current-trie-block may be set to equal the packed_trie_pointer identified by the current trie_vector_pointer. Variable packed_trie_pointer may identify the location of the packed table that stores an entry associated with the next index. Block 398 may follow block 388.

In block 390, variable trie_vector_valid may be set to false to indicate that the next index is not associated with a packed table.

In block 392, variable Current-trie-block may be set to the next trie pointer in the entry associated with the current index. Block 392 identifies an unpacked table to be used to access an entry for the next index. For example, such unpacked table may be similar to that described with respect to FIG. 1. Block 398 may follow block 392.

In block 394, variable trie_vector_valid may be set to false to indicate that the next index is not to access an entry from a packed table.

In block 396, variable Current-trie-block may be set to NULL. Setting variable Current-trie-block to NULL may indicate that no table is associated with a next index. Block 398 may follow block 396.

In block 398, variable Index may be set to the next 8 bits of DestinationIPv6Address. Accordingly, a next index value is set to the next 8 bits of DestinationIPv6Address. Other portions of the DestinationIPv6Address or other information may be used. Block 312 may follow block 398.

Figure 4:
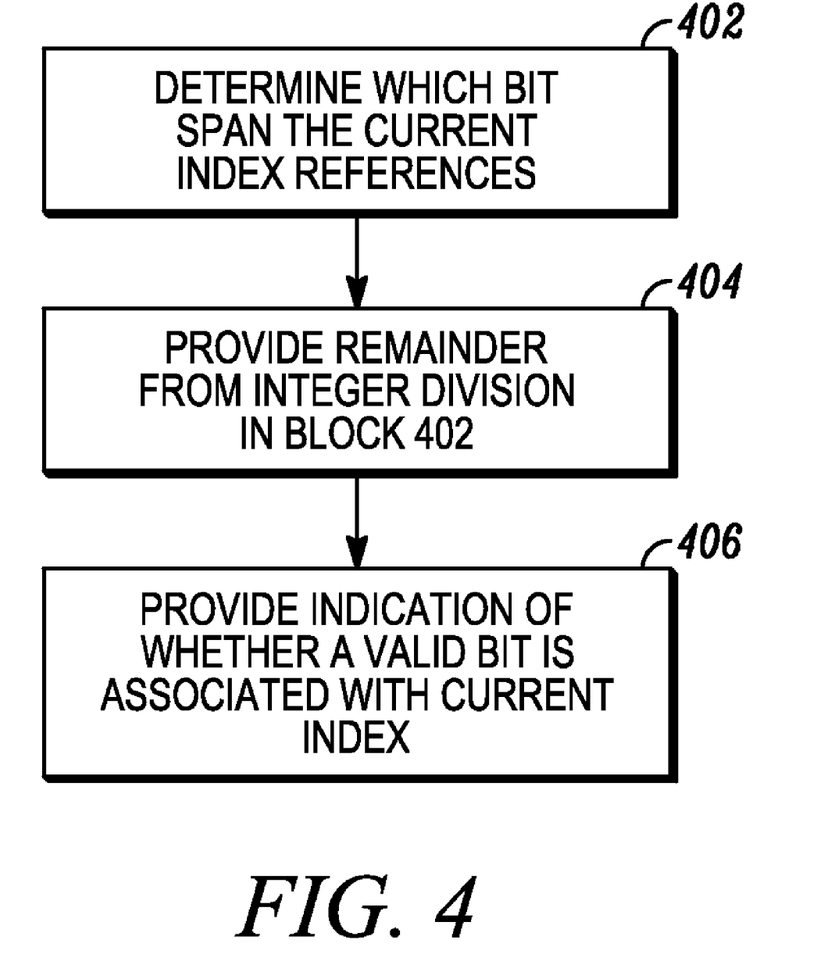
FIG. 4 provides a process that can be used to determine whether a valid entry is present in a packed table based on the occupancy vector, in accordance with some embodiments of the present invention.

FIG. 4 provides a process that can be used to determine whether a valid entry is present in a packed table based on the occupancy vector, in accordance with some embodiments of the present invention. The process of FIG. 4 can be used in a 32 bit arithmetic environment. The process may return an indication of TRUE or FALSE as to whether an entry in the packed table is valid. The current index may be a portion of the Destination IPv6 address or other information.

In block 402, a determination may be made of the 32 bit span referenced by the current index. For example, integer division with truncation may be performed by dividing the current index by 32. For computing environments other than 32 bit environments, the span can be set to the number of bits handled by the computing environment.

In block 404, a remainder of the division from block 402 may be provided. The remainder may identify the bit location in the occupancy vector associated with the current index.

In block 406, an indication may be provided of whether a valid bit is associated with the current index. A bit located in the 32 bit span determined in block 402 and based on the remainder of block 404 may point to the bit location in the occupancy vector associated with the current index. If the bit is ONE, then the indication of TRUE is provided. If the bit is ZERO, then the indication of FALSE is provided.

Figure 5:
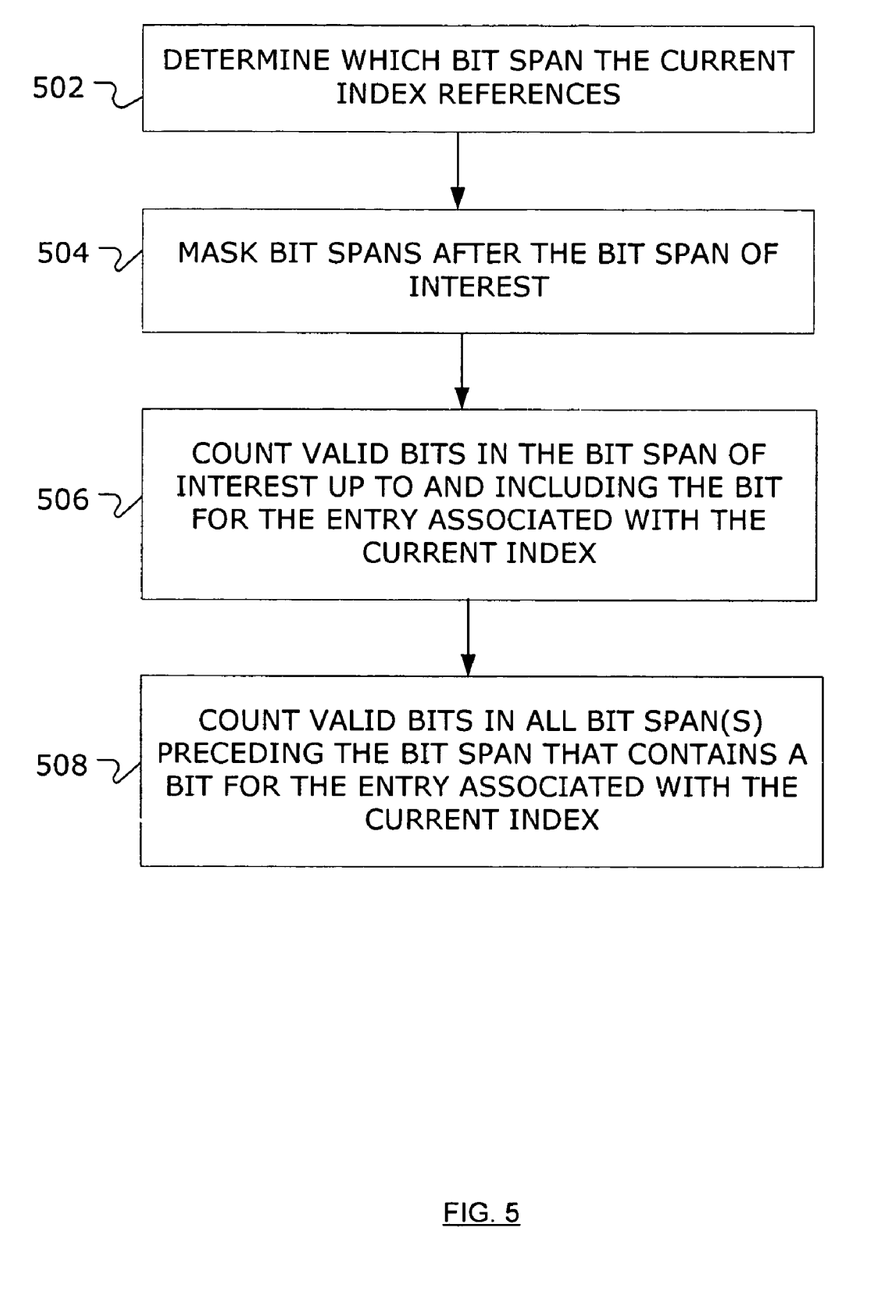
FIG. 5 provides a process that can be used to determine the packed index number based on the occupancy vector, in accordance with some embodiments of the present invention.

FIG. 5 provides a process that can be used to determine the packed index number based on the occupancy vector using 32 bit arithmetic, in accordance with some embodiments of the present invention. The occupancy vector may be 256 bits and a determination is made of what 32 bit span the index is located in. This process counts each valid entry in the occupancy vector up to and including the valid entry of interest. The packed index number may be the number of valid entries preceding and including the valid entry of interest.

In block 502, a determination may be made of which 32 bit span the current index references. For example, integer division with truncation may be performed by dividing the current index by 32. For computing environments other than 32 bit environments, the span can be set to the number of bits handled by the computing environment.

In block 504, bit span(s) after the bit span of interest may be masked off.

In block 506, a count may be made of valid bits in the bit span of interest up to and including the bit for the entry associated with the current index.

In block 508, a count may be made of valid bits in all 32 bit span(s) preceding the 32 bit span that contains a bit for the entry associated with the current index.

Figure 6:
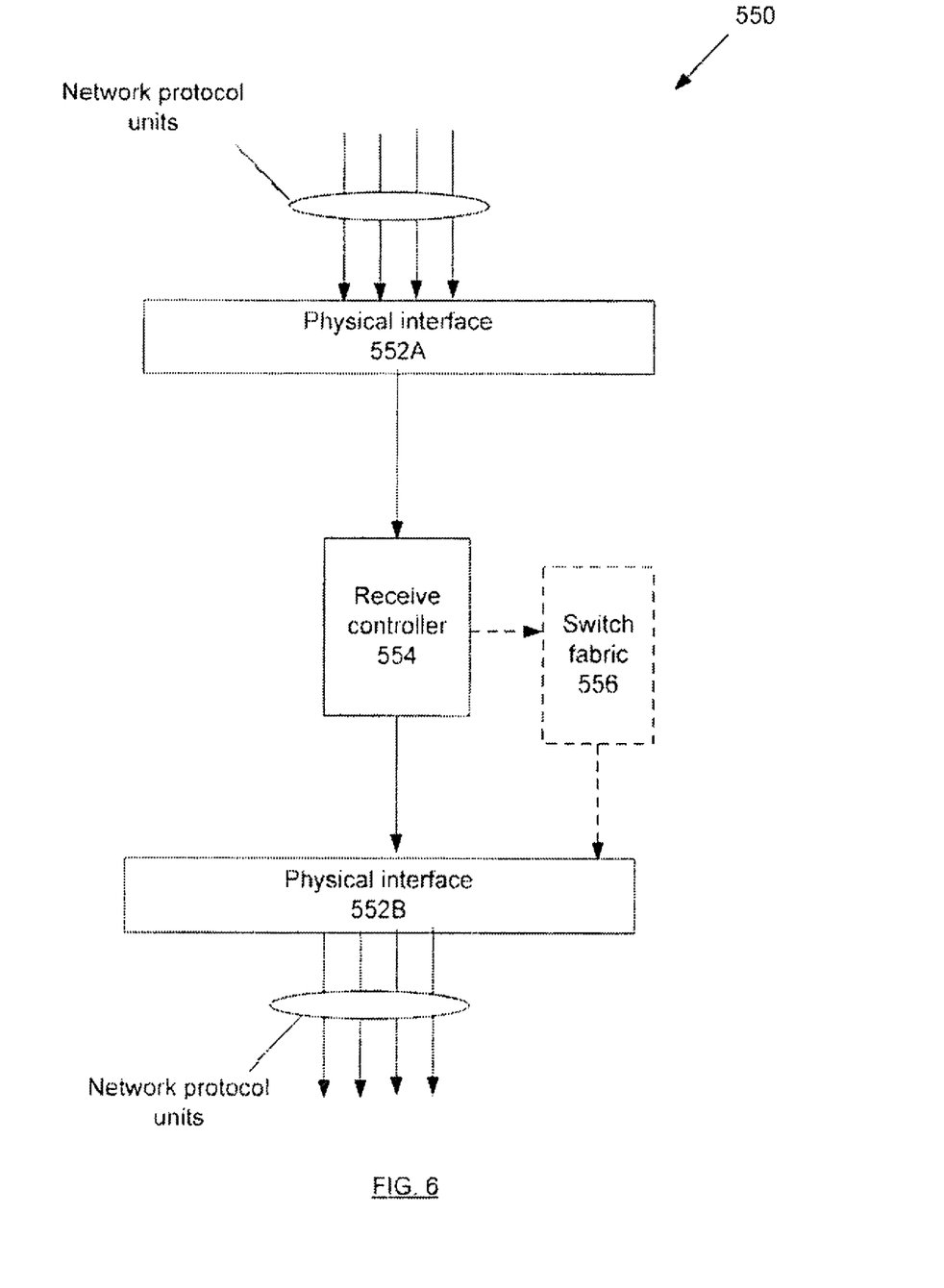
FIGS. 6 and 7 depict possible systems that can be used in some embodiments of the present invention.

FIG. 6 depicts in a router one possible system in which some embodiments of the present invention may be used. Router 550 may perform layer 3 switching of network protocol units. Router 550 may receive network protocol units having addresses provided in accordance at least with Internet Protocol Version 4 (IPv4), and/or Internet Protocol Version 6 (IPv6) (in compliance for example with the Internet Engineering Task Force (IETF) Draft Standard, Aug. 10, 1998). Network protocol units may be encapsulated as media access control (MAC) frames in accordance with the Ethernet protocol, described for example in versions of IEEE 802.3. Any protocols may be used to transmit network protocol units such as optical transport network (OTN), Synchronous Optical Network (SONET), and/or Synchronous Digital Hierarchy (SDH) standards.

Router 550 may include physical interfaces 552A and 552B, receive controller 554, and switch fabric 556. Physical interface 552A may include multiple input ports by which to receive network protocol units from other devices such as other switches, routers or computers. Physical interface 552B may include multiple output ports by which to transmit network protocol units to other devices such as other switches, routers or computers. Receive controller 554 may receive network protocol units from the physical interface 552A, process network protocol units, and provide network protocol units to the physical interface 552B for transmission to other devices.

The receive controller 554 may determine routing treatments for received network protocol units and may rewrite network protocol unit headers and/or alter routing-related information in network protocol unit headers. These routing treatments may include selection of one or more output interface ports of physical interface 552B to which to forward received network protocol units. Receive controller 554 may forward network protocol units and associated routing treatments to switch fabric 556. Switch fabric 556 may route network protocol units to designated output interface ports of physical interface 552B. Switch fabric 556 may conform, for example, to CSIX or other fabric technologies such as HyperTransport, Infiniband, PCI, Packet-Over-SONET, RapidIO, and/or UTOPI (Universal Test and Operations PHY Interface for ATM). Some embodiments of the present invention described herein may be used by receive controller 554 to assist in determining network protocol unit routing treatments.

Figure 7:
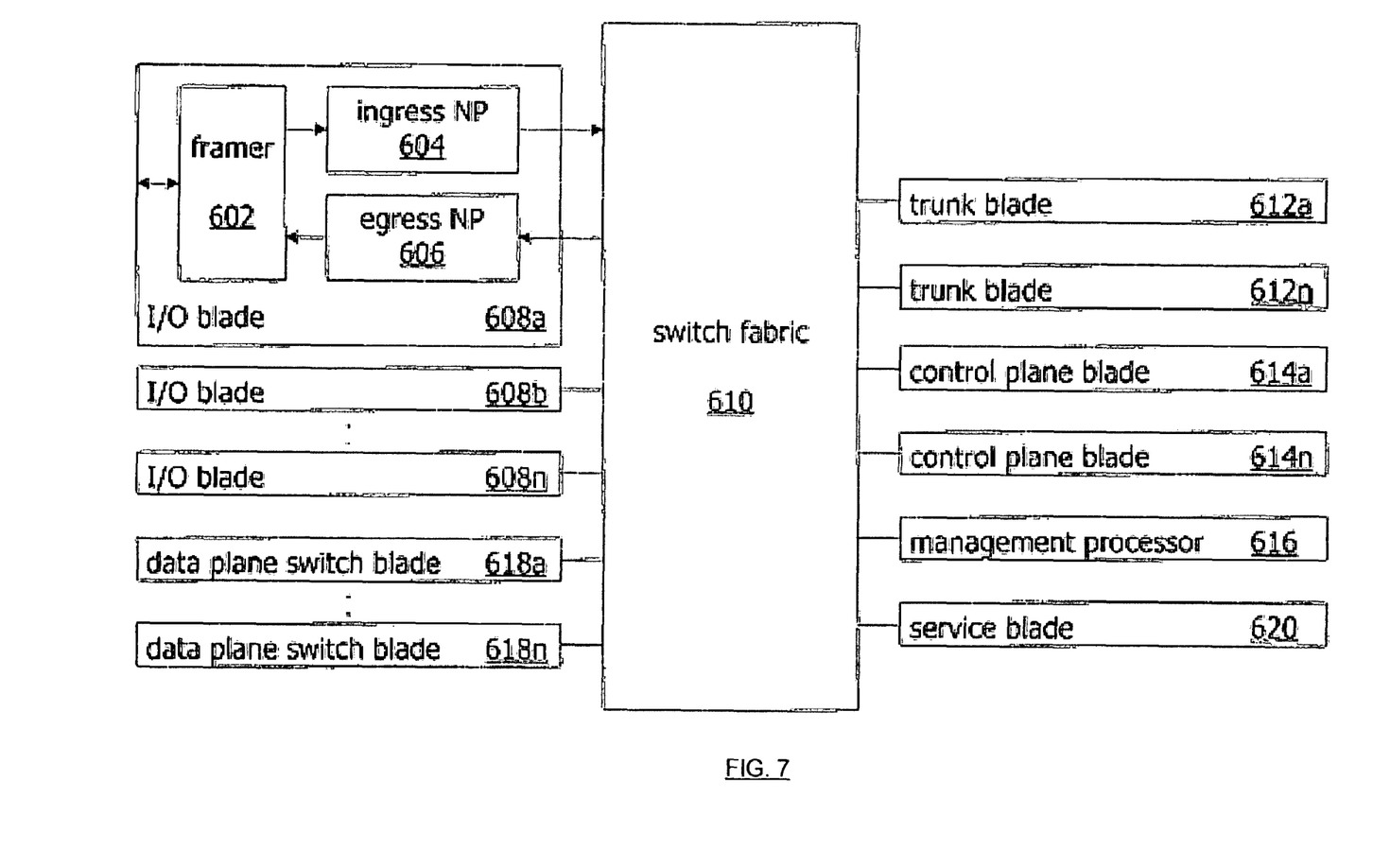

FIG. 7 depicts a system in accordance with some embodiments of the present invention. A collection of blades 608-620 is shown holding integrated circuitry interconnected by a switch fabric 610 (e.g., a crossbar or shared memory switch fabric). Any of blades 608-620 may use embodiments of the present invention to determine where to route a network protocol unit or make other uses of packed tables. As shown the device features a variety of blades performing different operations such as I/O blades 608a-608n, data plane switch blades 618a-618b, trunk blades 612a-612b, control plane blades 614a-614n, and service blades. Individual blades (e.g., 608a) may include one or more physical layer (PHY) devices (not shown) (e.g., optic, wire, and wireless PHYs) that handle communication over network connections. The PHYs translate between the physical signals carried by different network mediums and the bits (e.g., "0"s and "1"s) used by digital systems. The line cards 608-620 may also include framer devices (e.g., Ethernet, Synchronous Optic Network (SONET), High-Level Data Link (HDLC) framers or other "layer 2" devices) 602 that can perform operations on frames such as error detection and/or correction. The blades 608a shown may also include one or more network processors 604, 606 that perform packet processing operations for packets received via the PHY(s) 602 and direct the packets, via the switch fabric 610, to a blade providing an egress interface to forward the packet. Potentially, the network processor(s) 606 may perform "layer 2" duties instead of the framer devices 602. The network processors 604, 606 may feature techniques described above. The line cards 608-620 may also include cryptography devices that can perform encryption and decryption, among other tasks, for a variety of different cryptographic techniques.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored theron machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
   logic to determine whether to retrieve a second entry from a packed table or an unpacked table based in part on an indicator in a first entry, wherein:
   the first entry comprises a match pointer, a packed table indicator, and vector pointer,
   the indicator includes the packed table indicator, the packed table indicator indicates whether the vector pointer points to an unpacked table or a trie vector block, the trie vector block includes an occupancy vector and packed trie pointer, and the packed trie pointer identifies a location of a packed table associated with the second entry;

logic to selectively retrieve the second entry from a packed table in response to the indicator indicating storage of the second entry in a packed table, wherein the logic to retrieve is to:

determine whether a location associated with the second entry includes a valid entry, selectively determine a location in the packed table associated with the second entry in response to the determination that the location associated with the second entry includes a valid entry, and retrieve the second entry from the determined location in the packed table; and logic to selectively retrieve the second entry from an unpacked table in response to the indicator indicating storage of the second entry in an unpacked table.

2. The apparatus of claim 1, wherein the first entry comprises a portion of an IPv6 destination address.

3. The apparatus of claim 1, wherein to determine whether a location associated with the second entry includes a valid entry, the logic is to inspect the occupancy vector associated with the vector pointer.

4. The apparatus of claim 1, wherein to selectively determine a location in the packed table associated with the second entry, the logic is to count a number of valid entries in the occupancy vector up to and including the valid entry associated with the second entry.

5. A system comprising:

a switch fabric; and a device communicatively coupled to the switch fabric, wherein the device comprises a line card and wherein the line card includes:

logic to receive a first entry;

logic to determine whether to retrieve a second entry from a packed table or an unpacked table based in part on an indicator in the first entry, wherein:

the first entry comprises a match pointer, a packed table indicator, and vector pointer, the indicator includes the packed table indicator, the packed table indicator indicates whether the vector pointer points to an unpacked table or a trie vector block, the trie vector block includes an occupancy vector and packed trie pointer, and the packed trie pointer identifies a location of a packed table associated with the second entry;

logic to selectively retrieve the second entry from a packed table in response to the indicator indicating storage of the second entry in a packed table, wherein the logic to selectively retrieve is to:

determine whether a location associated with the second entry includes a valid entry, selectively determine a location in the packed table associated with the second entry in response to the determination that the location associated with the second entry includes a valid entry, and retrieve the second entry from the determined location in the packed table; and logic to selectively retrieve the second entry from an unpacked table in response to the indicator indicating storage of the second entry in an unpacked table.

6. The system of claim 5, wherein the first entry comprises a portion of an IPv6 destination address.

7. The system of claim 5, wherein to determine whether a location is associated with the second entry includes a valid entry, the logic is to inspect an occupancy vector associated with the vector pointer.

8. The system of claim 7, wherein to selectively determine a location in the packed table associated with the second entry, the logic is to count a number of valid entries in the occupancy vector up to and including the valid entry associated with the second entry.

9. The system of claim 5, further comprising a second device communicatively coupled to the switch fabric, wherein the second device includes a capability selected from a group consisting of: a physical layer processing, framing, packet processing, and cryptography.

* * * * *